(12) United States Patent
Murakami et al.

(10) Patent No.: US 10,985,649 B2
(45) Date of Patent: Apr. 20, 2021

(54) POWER CONVERSION DEVICE WITH IN-PHASE AND INTERLEAVE DRIVING BASED ON DETERMINATION OF DUTY RATIO

(71) Applicant: Mitsubishi Electric Corporation, Chiyoda-ku (JP)

(72) Inventors: Satoshi Murakami, Chiyoda-ku (JP); Ryota Kondo, Chiyoda-ku (JP); Takaaki Takahara, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/344,574

(22) PCT Filed: Dec. 22, 2016

(86) PCT No.: PCT/JP2016/088326
§ 371 (c)(1),
(2) Date: Apr. 24, 2019

(87) PCT Pub. No.: WO2018/116437
PCT Pub. Date: Jun. 28, 2018

(65) Prior Publication Data
US 2020/0052576 A1 Feb. 13, 2020

(51) Int. Cl.
H02M 1/42 (2007.01)
H02M 1/14 (2006.01)
(Continued)

(52) U.S. Cl.
CPC .......... H02M 1/4225 (2013.01); H02M 1/14 (2013.01); H02M 3/158 (2013.01); H02M 7/219 (2013.01); H02M 1/08 (2013.01)

(58) Field of Classification Search
CPC .......... H02M 1/143; H02M 1/14; H02M 1/44; H02M 1/4225; H02M 2003/1586;
(Continued)

(56) References Cited

U.S. PATENT DOCUMENTS 8,885,372 B1* 11/2014 Nanut .................. H02M 1/12
363/69
2009/0180305 A1 7/2009 Hashino et al.
(Continued)

FOREIGN PATENT DOCUMENTS

JP 5144284 B2 2/2013
JP 5210331 B2 6/2013

OTHER PUBLICATIONS

International Search Report dated Feb. 7, 2017 in PCT/JP2016/088326 filed on Dec. 22, 2016.
(Continued)

Primary Examiner — Gustavo A Rosario-Benitez
(74) Attorney, Agent, or Firm — Xsensus LLP

(57) ABSTRACT

A power conversion device including: a reactor formed such that a DC winding and a plurality of coupled windings are wound around one magnetic body, one end of the DC winding is connected to a voltage source, one end of each of the plurality of coupled windings is connected to another end of the DC winding, another end of each of the plurality of coupled windings is connected to each intermediate connection point between a plurality of upper and lower arms composed of switching elements, and magnetic fluxes generated by currents flowing through the DC winding and the coupled windings merge with each other in the same direction; and a control device for controlling the switching elements, wherein the upper arms or the lower arms are controlled by in-phase driving or interleave driving on the basis of the duty of switching operation.

12 Claims, 14 Drawing Sheets

(51) Int. Cl.
*H02M 7/219* (2006.01)
*H02M 3/158* (2006.01)
*H02M 1/08* (2006.01)

(58) Field of Classification Search
CPC ...... H02M 1/081; H02M 1/42; H02M 1/4208; H02M 1/4266; H02M 7/12; H02M 7/219; H02M 2001/0058; H02M 2001/0064
See application file for complete search history.

(56) References Cited

U.S. PATENT DOCUMENTS

| | | | |
|---|---|---|---|
| 2010/0320994 | A1 | 12/2010 | Hashino et al. |
| 2011/0037444 | A1* | 2/2011 | Wildash ............... H02M 1/44 323/210 |
| 2013/0003427 | A1* | 1/2013 | Pan ................. H02M 1/4208 363/44 |
| 2013/0141199 | A1* | 6/2013 | Hayes ................. H01F 38/02 336/5 |
| 2014/0016367 | A1* | 1/2014 | Chandrasekaran ... H02M 3/155 363/21.12 |
| 2014/0146585 | A1* | 5/2014 | Tao ................... H02M 7/538 363/41 |
| 2014/0313795 | A1* | 10/2014 | Mi ..................... H02M 1/44 363/44 |
| 2015/0194909 | A1* | 7/2015 | Pahlevaninezhad ........................ H02M 7/5387 363/132 |
| 2017/0019017 | A1* | 1/2017 | Hawley ............. H02M 1/143 |
| 2017/0294833 | A1* | 10/2017 | Yang ................ H01F 27/2804 |
| 2018/0234008 | A1* | 8/2018 | Wolf ................. H01F 37/00 |

OTHER PUBLICATIONS

Office Action dated Nov. 25, 2020, in corresponding European patent Application No. 16 924 782.2, 8 pages.

* cited by examiner

⇨ DC MAGNETIC FLUX

→ AC MAGNETIC FLUX (DIRECTION CHANGES IN ACCORDANCE WITH SWITCHING OPERATION)

POWER CONVERSION DEVICE WITH IN-PHASE AND INTERLEAVE DRIVING BASED ON DETERMINATION OF DUTY RATIO

TECHNICAL FIELD

The present invention relates to a power conversion device that performs conversion between DC voltage and DC voltage or between AC voltage and DC voltage.

BACKGROUND ART

As a conventional power converter, for example, in a circuit configuration for bridge-less power factor correction (PFC), there is known a configuration in which current of legs for which switching is performed is distributed as two currents, a reactor is provided to each leg, and interleave operation is performed (see, for example, Patent Document 1). In addition, in a magnetism integrated circuit configuration, a circuit configuration that causes DC magnetic fluxes to cancel out each other is known (see, for example, Patent Document 2).

CITATION LIST

Patent Document

Patent Document 1: Japanese Patent No. 5210331
Patent Document 2: Japanese Patent No. 5144284

SUMMARY OF THE INVENTION

Problems to be Solved by the Invention

In a switching power supply device of the power converter shown in Patent Document 1, legs for which switching is performed are provided for N phases, and switching is performed with the phases shifted by 360/N degrees, whereby, owing to a current dividing function, loss can be reduced and input/output current ripple can be reduced. However, downsizing by integrating the reactors provided for N phases, and reduction of ripple current flowing through a winding of the integrated reactor, are not disclosed at all. In Patent Document 2 which discloses magnetic circuit integration, windings of a core are wound in such directions that DC magnetic fluxes cancel out each other. Therefore, while magnetic flux saturation by DC magnetic fluxes can be prevented, there is a problem that a DC inductance can be formed only by a leakage magnetic flux. The present invention has been made to solve such problems, and an object of the present invention is to provide a power conversion device in which a plurality of reactors are magnetically integrated to one core, current ripple can be suppressed, and loss can be reduced.

Solution to the Problems

A power conversion device according to the present invention includes: a reactor formed such that a DC winding and a plurality of coupled windings are wound around one magnetic body, one end of the DC winding is connected to a voltage source, one end of each of the plurality of coupled windings is connected to another end of the DC winding, another end of each of the plurality of coupled windings is connected to each intermediate connection point between a plurality of upper and lower arms composed of switching elements, and magnetic fluxes generated by currents flowing through the DC winding and the coupled windings merge with each other in the same direction; and a control device for controlling the switching elements, wherein control is performed such that when a duty of switching operation is smaller than 0.5, the upper arms or the lower arms are subjected to in-phase driving, and when the duty is greater than 0.5, driving for the upper arms or the lower arms is switched to interleave driving.

Effect of the Invention

In the power conversion device according to the present invention, control is performed so as to switch between interleave driving and in-phase driving, whereby heat in the DC winding and the coupled windings can be uniformed, and further size reduction can be achieved in terms of heat dissipation.

DESCRIPTION OF EMBODIMENTS

Embodiment 1

Figure 1:
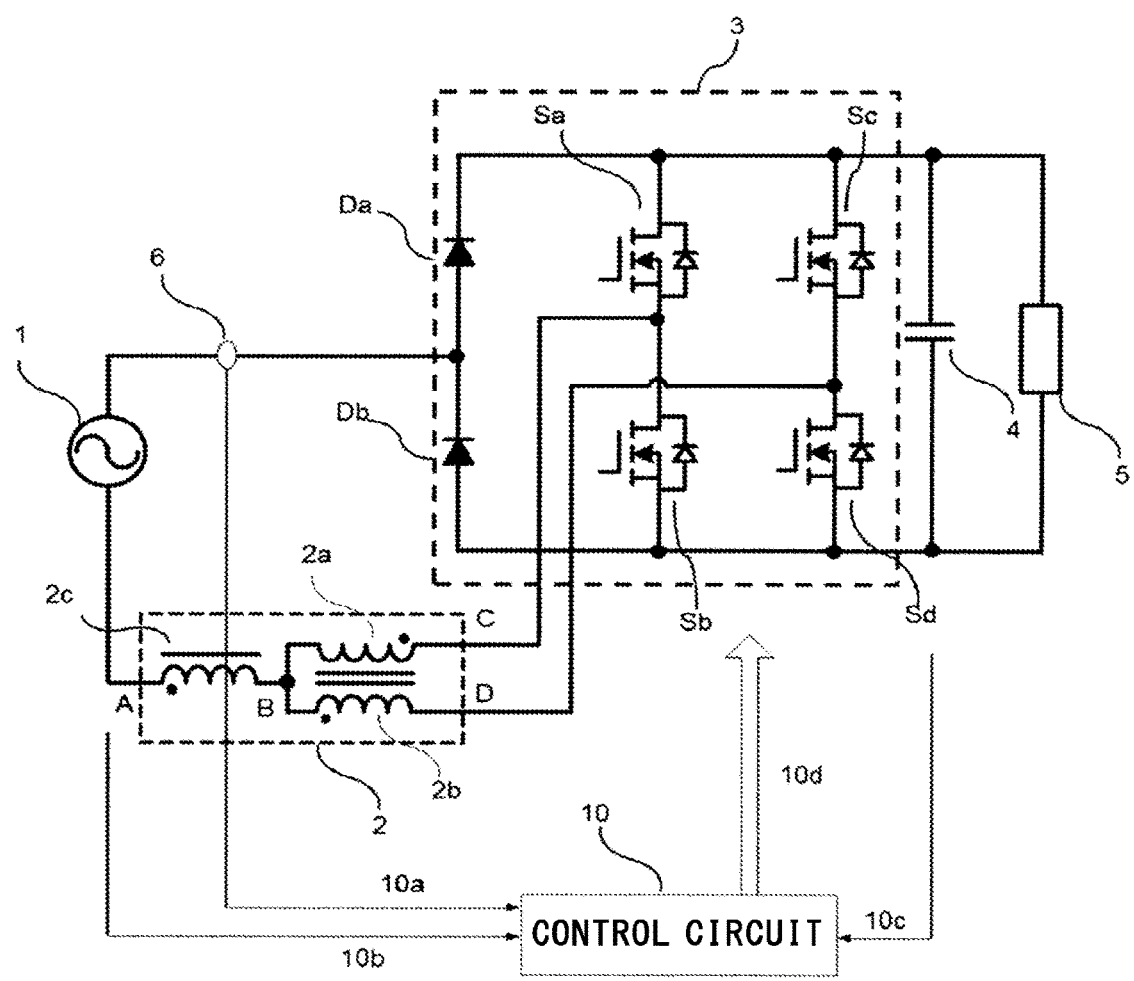
FIG. 1 is a circuit configuration diagram of a power conversion device according to embodiment 1 of the present invention.
Figure 2:
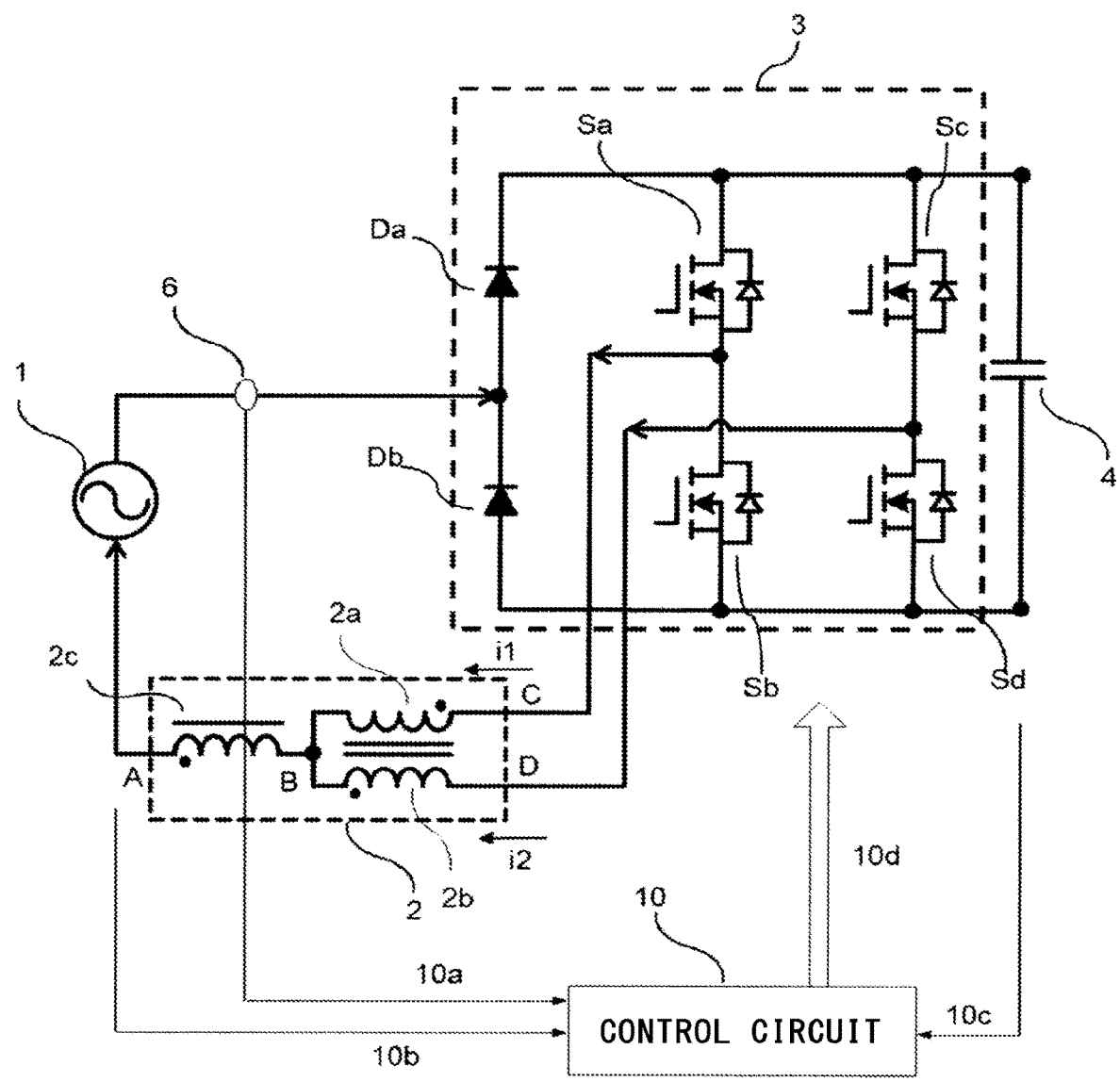
FIG. 2 illustrates a current route in the case of positive polarity in the circuit in FIG. 1.
Figure 3:
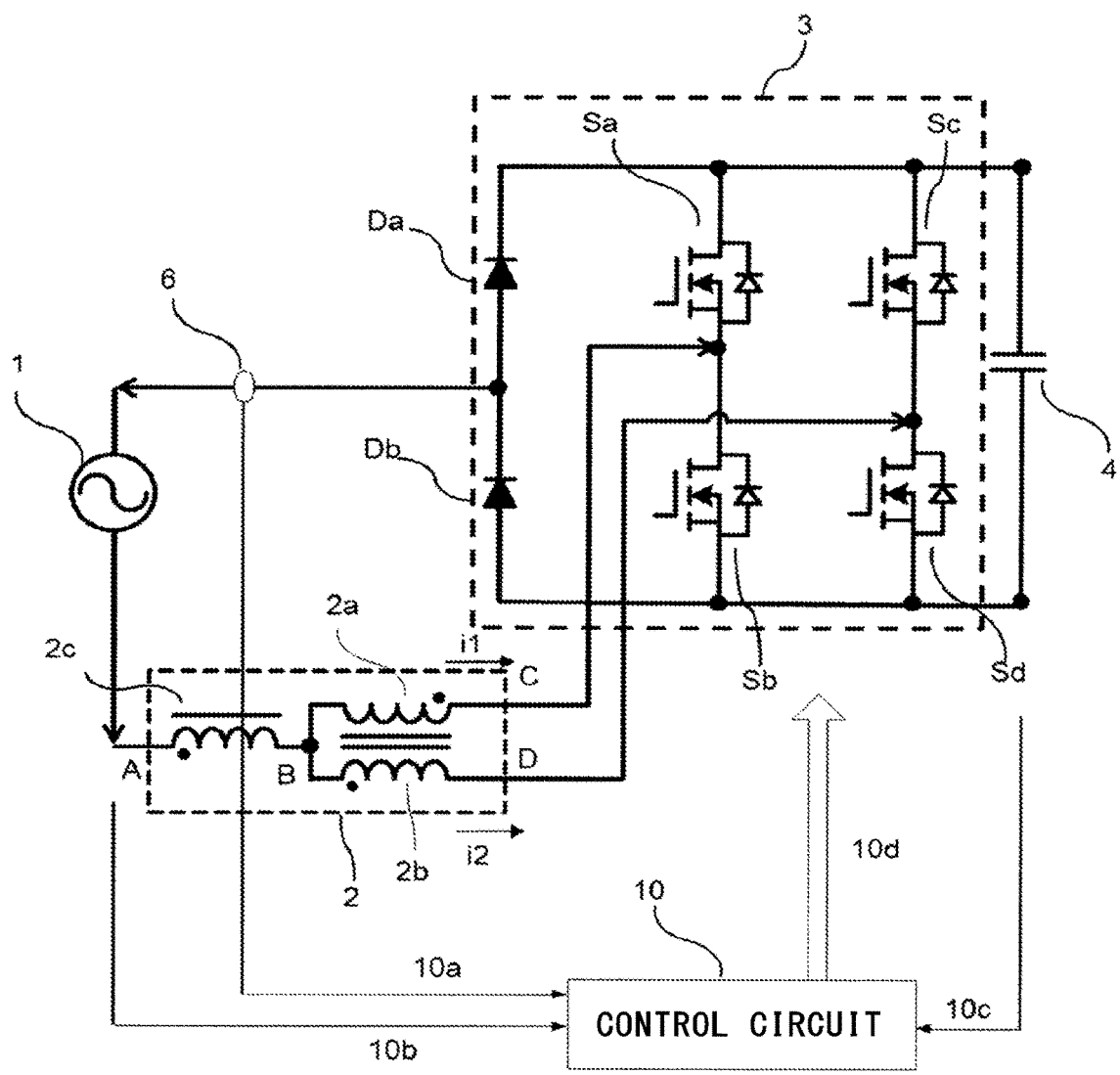
FIG. 3 illustrates a current route in the case of negative polarity in the circuit in FIG. 1.

FIG. 1 shows a circuit configuration of a power conversion device according to embodiment 1 of the present invention, FIG. 2 shows a current route in the case of positive polarity in the circuit shown in FIG. 1, and FIG. 3 schematically illustrates a current route in the case of negative polarity in the circuit shown in FIG. 1.

As shown in FIG. 1, one end of an AC voltage source 1 is connected to one end of a third winding 2c composing an integrated magnetic part 2 (point A), and another end of the third winding 2c is connected to a point (point B) at which a first winding 2a and a second winding 2b are connected. The first winding 2a and the second winding 2b are each connected between upper and lower arms in a converter circuit 3 (point C, point D), and output of the converter circuit 3 is connected to a load 5 via a link capacitor 4.

Another end of the AC voltage source 1 is connected to the middle point between rectification elements Da, Db connected in series in the converter circuit 3, the cathode of the rectification element Da is connected to the positive terminal of the link capacitor 4, and the anode of the rectification element Db is connected to the negative terminal of the link capacitor 4.

A control circuit 10 generates a drive signal 10d for driving the converter circuit 3, on the basis of input current information 10a from a current sensor 6, input voltage information 10b from the AC voltage source 1, and voltage information 10c about the link capacitor 4 which corresponds to output voltage, thereby performing control so as to achieve target output voltage and performing control so as to achieve high power factor operation in which the AC voltage phase and the AC current phase are synchronized with each other.

Figure 14:
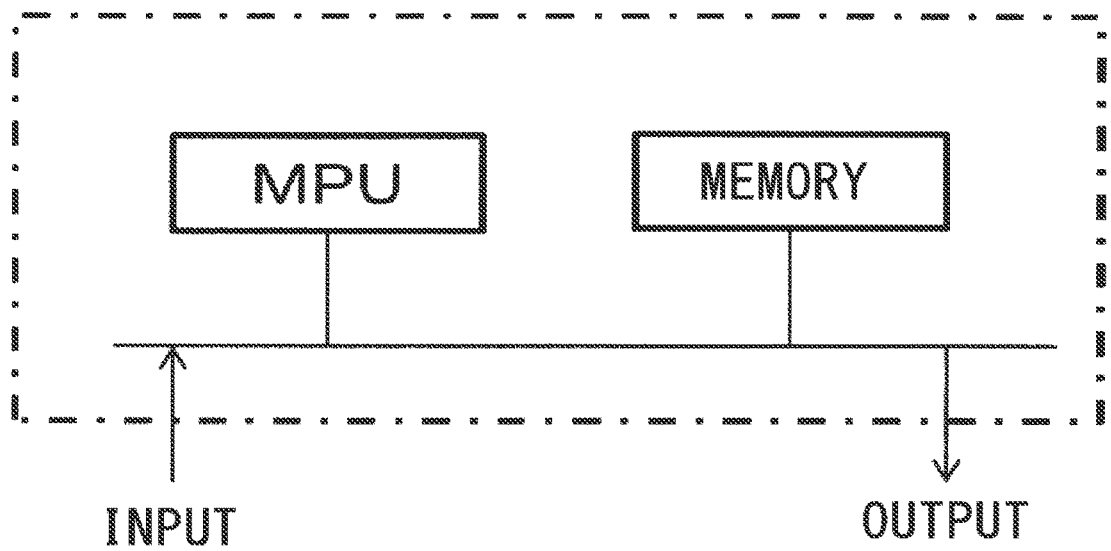
FIG. 14 is a hardware configuration diagram of a control circuit according to embodiments 1 to 4 of the present invention.

As shown in FIG. 14, the control circuit 10 may be implemented by combination of a processor (MPU) and a computer program stored in a memory, may be implemented by dedicated hardware such as ASIC, may be implemented by a reconfigurable gate array such as FPGA, or may be implemented by combination of these.

FIG. 2 shows a current route (arrows in the drawing) in the case where the AC input voltage is positive in the power converter circuit in embodiment 1 shown in FIG. 1.

Current from the AC voltage source 1 flows through the rectification element Da and then the link capacitor 4 in the converter circuit 3, and then is divided to switching elements Sb, Sd which are turned on in the converter circuit 3. Then, the currents are merged at the integrated magnetic part 2, and the current returns to the AC voltage source 1. At this time, switching elements Sa, Sc in the converter circuit 3 are caused to perform switching operations, thereby exciting the integrated magnetic part 2 and stepping up the voltage of the AC voltage source 1.

FIG. 3 shows a current route (arrows in the drawing) in the case where the AC input voltage is negative in the power converter circuit in embodiment 1 shown in FIG. 1.

Current from the AC voltage source 1 flows into the integrated magnetic part 2 and then is divided to the switching elements Sa, Sc which are turned on in the converter circuit 3. Then, the current flows into the link capacitor 4, passes through the rectification element Db in the converter circuit 3, and then returns to the AC voltage source 1. At this time, the switching elements Sb, Sd in the converter circuit 3 are caused to perform switching operations with their phases shifted by 180 degrees, thereby exciting the integrated magnetic part 2 and stepping up the voltage of the AC voltage source 1.

Next, the configuration of the integrated magnetic part 2 described above will be described, and expressions of a DC inductance and an AC inductance of the integrated magnetic part 2 and an expression of current ripple will be shown. In the following description, control for the switching elements Sb, Sd composing the lower arms will be described using the example of the current route in the case of negative polarity shown in FIG. 3. The same operations and effects are provided by controlling the switching elements Sa, Sc in the current route in the case of positive polarity shown in FIG. 2.

Figure 4A:
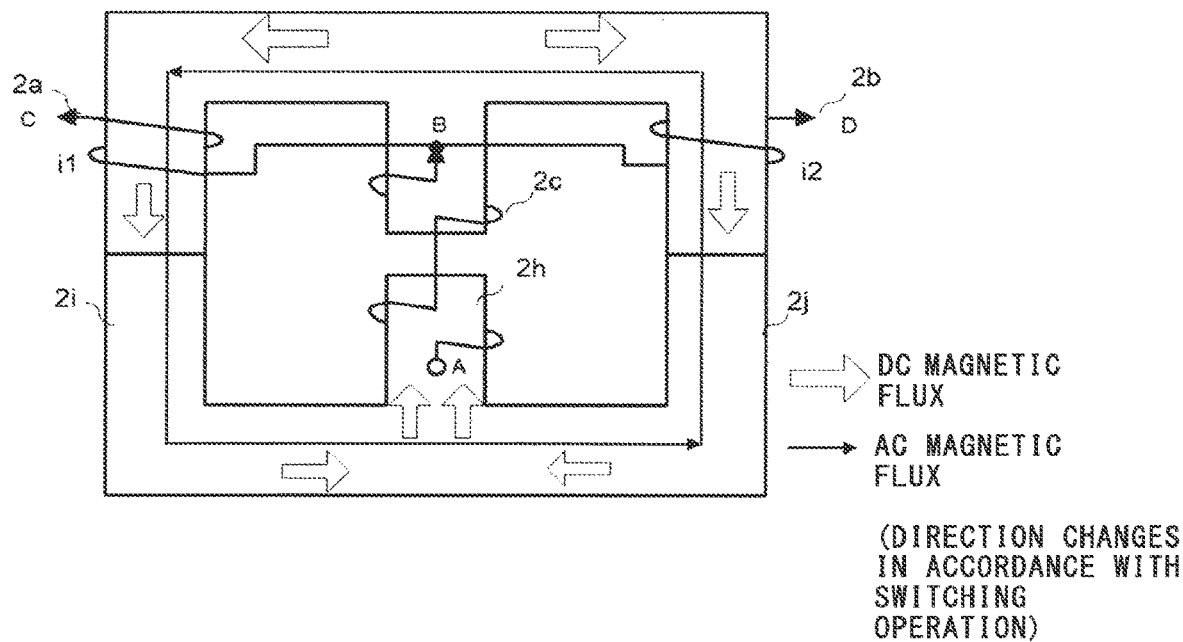
FIG. 4A is a schematic diagram showing, by a magnetic resistor network, an integrated magnetic part in embodiment 1 of the present invention.
Figure 4B:
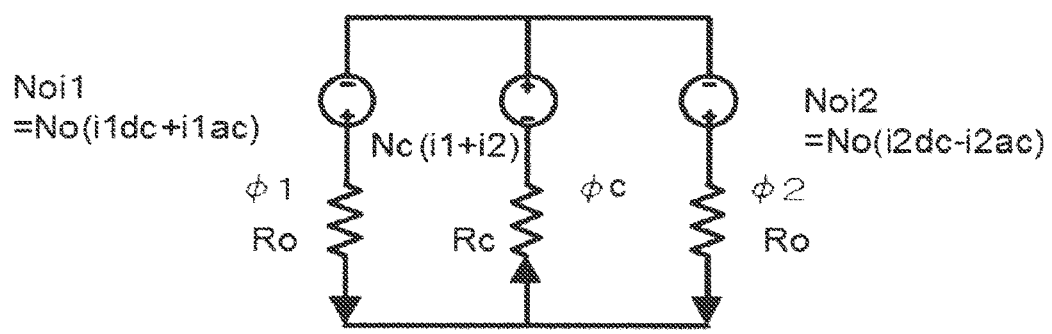
FIG. 4B is a magnetic equivalent circuit diagram corresponding to FIG. 4A.

FIG. 4A is a schematic diagram showing, by a magnetic resistor network, the integrated magnetic part 2 in embodiment 1, and FIG. 4B shows a magnetic equivalent circuit corresponding to FIG. 4A. The meanings of the symbols in the drawings are as follows.

No: number of turns of first winding 2a, second winding 2b

Nc: number of turns of third winding 2c ic: current of third winding 2c i1: current of first winding 2a i2: current of second winding 2b Ro: magnetic resistance of first side leg 2i, second side leg 2j of core Rc: magnetic resistance of center leg 2h of core $\varphi 1$: magnetic flux of first side leg 2i of core $\varphi 2$: magnetic flux of second side leg 2j of core $\varphi c$: magnetic flux of center leg 2h of core In FIG. 4A, the core of the integrated magnetic part 2 has, for example, a shape having three legs, such as EE type or EI type. The first winding 2a is wound around a first side leg 2i of the core and the second winding 2b is wound around a second side leg 2j of the core such that DC magnetic fluxes are cancelled out by each other, thereby forming a coupled reactor. The third winding 2c is wound around a center leg 2h of the core in such a direction as to strengthen with the magnetic fluxes of the first winding 2a and the second winding 2b, thereby forming a DC reactor. A gap for preventing DC magnetic flux saturation is provided in the center leg 2h of the core. The gap may be configured such that the coupling degree of the coupled reactor and the coupling degree between the coupled reactor and the DC reactor are also adjusted and an AC magnetic flux leaked from the gap is canceled out.

DC magnetic fluxes are generated so as to merge at the center leg 2h of the core, and the directions thereof do not change unless the power transmission direction is changed. On the other hand, AC magnetic fluxes circulate through the side legs 2i, 2j of the core while the directions thereof change every time the switching elements Sb, Sd perform switching. In the center leg 2h of the core, the circulating AC magnetic fluxes always have opposite directions and thus are canceled out by each other.

Next, it will be described that the inductance of the integrated magnetic part 2 is composed of a self-inductance, a mutual inductance, and a leakage inductance.

Magnetic fluxes $\varphi 1$, $\varphi 2$, $\varphi c$ generated in the windings are represented by (Expression 1) from the relationship of the magnetomotive force of the core of each of the side legs 2i, 2j and the center leg 2h of the core.

[Mathematical 1]

$$\begin{pmatrix} \phi 1 \\ \phi 2 \\ \phi c \end{pmatrix} = \begin{pmatrix} \dfrac{R_O + R_C}{R_O^2 + 2R_O \times R_C} & \dfrac{-R_C}{R_O^2 + 2R_O \times R_C} & \dfrac{R_O}{R_O^2 \times 2R_O \times R_C} \\ \dfrac{-R_C}{R_O^2 + 2R_O \times R_C} & \dfrac{R_0 + R_C}{R_O^2 + 2R_O \times R_C} & \dfrac{R_0}{R_O^2 + 2R_O \times R_C} \\ \dfrac{R_O}{R_O^2 + 2R_O \times R_C} & \dfrac{R_O}{R_O^2 + 2R_O \times R_C} & \dfrac{2R_O}{R_O^2 + 2R_O \times R_C} \end{pmatrix} \begin{pmatrix} N_O \times i_1 \\ N_O \times i_2 \\ N_C \times i_c \end{pmatrix}$$

(Expression 1)

Where voltage generated in the first winding 2a is V1, voltage generated in the second winding 2b is V2, and voltage generated in the third winding 2c is Vc, V1=Nodφ1/dt, V2=Nodφ2/dt, and Vc=Ncdφc/dt are satisfied.

Using these, if (Expression 1) is deformed, V1, V2, and Vc are represented by (Expression 2) and (Expression 3).

[Mathematical 2]

$$\begin{pmatrix} V1 \\ V2 \\ Vc \end{pmatrix} = A \begin{pmatrix} \dfrac{d}{dt} i_1 \\ \dfrac{d}{dt} i_2 \\ \dfrac{d}{dt} i_C \end{pmatrix}$$

(Expression 2)

[Mathematical 3]

$$A = \begin{pmatrix} N_O^2 \dfrac{R_O + R_C}{R_O^2 + 2R_O \times R_C} & N_O^2 \dfrac{-R_C}{R_O^2 + 2R_O \times R_C} & N_O N_C \dfrac{R_O}{R_O^2 + 2R_O \times R_C} \\ N_O^2 \dfrac{-R_C}{R_O^2 + 2R_O \times R_C} & N_O^2 \dfrac{R_O + R_C}{R_O^2 + 2R_O \times R_C} & N_O N_C \dfrac{R_O}{R_O^2 + 2R_O \times R_C} \\ N_O N_C \dfrac{R_O}{R_O^2 + 2R_O \times R_C} & N_O N_C \dfrac{R_O}{R_O^2 + 2R_O \times R_C} & N_C^2 \dfrac{2R_O}{R_O^2 + 2R_O \times R_C} \end{pmatrix}$$

(Expression 3)

The first winding 2a and the second winding 2b, and the first side leg 2i and the second side leg 2j of the core, are symmetric.

Therefore, where the self-inductance of each of the first side leg 2i and the second side leg 2j is Lo, the self-inductance of the center leg 2h is Lc, the mutual inductance of the first side leg 2i and the second side leg 2j is Mo, and the mutual inductance between the center leg 2h, and the first side leg 2i and the second side leg 2j, is Mc, (Expression 2) can be represented by (Expression 4).

[Mathematical 4]

$$\begin{pmatrix} V1 \\ V2 \\ Vc \end{pmatrix} = \begin{pmatrix} L_O & -M_O & M_C \\ -M_O & L_O & M_C \\ M_C & M_C & L_C \end{pmatrix} \begin{pmatrix} \dfrac{d}{dt} i_1 \\ \dfrac{d}{dt} i_2 \\ \dfrac{d}{dt} i_c \end{pmatrix}$$

(Expression 4)

From ic=i1+i2, (Expression 4) can be deformed to obtain (Expression 5).

[Mathematical 5]

$$\begin{pmatrix} V1 \\ V2 \\ Vc \end{pmatrix} = \begin{pmatrix} L_O + M_C & -M_O + M_C \\ -M_O + M_C & L_O + M_C \\ L_C + M_C & L_C + M_C \end{pmatrix} \begin{pmatrix} \dfrac{d}{dt} i_1 \\ \dfrac{d}{dt} i_2 \end{pmatrix}$$

(Expression 5)

From comparison between (Expression 2), (Expression 3), and (Expression 4), Lo, Lc, Mo, and Mc are respectively represented by (Expression 6) to (Expression 9) below.

[Mathematical 6]

$$L_O = N_O^2 \dfrac{R_O + R_C}{R_O^2 + 2R_O \times R_C}$$

(Expression 6)

[Mathematical 7]

$$L_C = N_C^2 \dfrac{2R_O}{R_O^2 + 2R_O \times R_C}$$

(Expression 7)

[Mathematical 8]

$$M_O = N_O^2 \dfrac{R_C}{R_O^2 + 2R_O \times R_C}$$

(Expression 8)

[Mathematical 9]

$$M_C = N_O N_C \dfrac{R_O}{R_O^2 \times 2R_O \times R_C}$$

(Expression 9)

Where the coupling degree between the first winding 2a and the second winding 2b is ko, and the coupling degree between the first winding 2a, and the second winding 2b and the third winding 2c, is kc, ko and kc are respectively represented by (Expression 10) and (Expression 11).

[Mathematical 10]

$$k_O = \dfrac{M_O}{\sqrt{L_O L_O}} = \dfrac{R_C}{R_O + R_C}$$

(Expression 10)

[Mathematical 11]

$$k_C = \dfrac{M_C}{\sqrt{L_O L_C}} = \dfrac{R_O}{\sqrt{2R_O(R_o + R_C)}}$$

(Expression 11)

Where voltage between the third winding 2c and the first winding 2a is V1e(A-C) and voltage between the third winding 2c and the second winding 2b is V2e(A-D), these are respectively represented by (Expression 12) and (Expression 13).

[Mathematical 12]

$$V_{1e} = V1 + V_C \quad \text{(Expression 12)}$$

[Mathematical 13]

$$V_{2e} = V2 + V_C \quad \text{(Expression 13)}$$

From the above (Expression 12) and (Expression 13), using Vin as input voltage and Vout as output voltage, the following are obtained.

For example, in the current route shown in FIG. 3, in the case where the switching element Sb connected to the winding is turned on and the switching element Sd connected to the winding is turned off, V1e=Vin and V2e=Vin−Vout are satisfied.

In the case where the switching element Sd connected to the winding is turned on and the switching element Sb connected to the winding is turned off, V1e=Vin−Vout and V2e=Vin are satisfied.

In the case where the switching element Sb connected to the winding is turned off and the switching element Sd connected to the winding is turned off, V1e=Vin−Vout and V2e=Vin−Vout are satisfied.

In the case where the switching element Sb connected to the winding is turned on and the switching element Sd connected to the winding is turned on, V1e=Vin and V2e=Vin are satisfied.

If (Expression 5) is substituted into (Expression 12) and (Expression 13), V1e and V2e are represented by (Expression 14).

[Mathematical 14]

$$\begin{pmatrix} V_{1e} \\ V_{2e} \end{pmatrix} = \begin{pmatrix} L_O + L_C + 2M_C & L_C - M_O + 2M_C \\ L_C - M_O + 2M_C & L_O + L_C + 2M_C \end{pmatrix} \begin{pmatrix} \frac{d}{dt}i_1 \\ \frac{d}{dt}i_2 \end{pmatrix} \quad \text{(Expression 14)}$$

Currents i1, i2 are represented using a DC component idc and an AC component iac as shown by (Expression 15).

[Mathematical 15]

$$\frac{d}{dt}i_1 = \frac{d}{dt}i_{dc} + \frac{d}{dt}i_{ac}$$
$$\frac{d}{dt}i_2 = \frac{d}{dt}i_{dc} - \frac{d}{dt}i_{ac} \quad \text{(Expression 15)}$$

From (Expression 14) and (Expression 15), the DC component and the AC component of the above currents are represented by (Expression 16) and (Expression 17).

[Mathematical 16]

$$\frac{d}{dt}i_{dc} = \frac{1}{2}\left(\frac{d}{dt}i_1 + \frac{d}{dt}i_2\right) = \frac{1}{(2L_C + 4M_C + L_O - M_O)} \times \frac{(V_{1e} + V_{2e})}{2} \quad \text{(Expression 16)}$$

[Mathematical 17]

$$\frac{d}{dt}i_{ac} = \frac{1}{2}\left(\frac{d}{dt}i_1 - \frac{d}{dt}i_2\right) = \frac{1}{(L_O + M_O)} \times \frac{(V_{1e} - V_{2e})}{2} \quad \text{(Expression 17)}$$

In (Expression 16) and (Expression 17), regarding the following values:

[Mathematical 18]

$$\frac{d}{dt}i_{dc}, \frac{d}{dt}i_{ac},$$

these values are represented by (Expression 18) and (Expression 19), using (Expression 6) to (Expression 9).

[Mathematical 19]

$$\frac{d}{dt}i_{dc} = \quad \text{(Expression 18)}$$
$$\frac{1}{2}\left(\frac{d}{dt}i_1 + \frac{d}{dt}i_2\right) = \frac{R_O + 2R_C}{(N_O^2 + 4N_C^2 + 4N_O N_C)} \times \frac{(V_{1e} + V_{2e})}{2}$$

[Mathematical 20]

$$\frac{d}{dt}i_{ac} = \frac{1}{2}\left(\frac{d}{dt}i_1 - \frac{d}{dt}i_2\right) = \frac{R_O}{N_O^2} \times \frac{(V_{1e} - V_{2e})}{2} \quad \text{(Expression 19)}$$

For example, when the switching element Sb is ON and the switching element Sd is OFF, (Expression 18) and (Expression 19) are represented by (Expression 20) and (Expression 21), using the input voltage Vin and the output voltage Vout. Thus, it is found that the AC component (AC current ripple) iac does not change depending on the input voltage, and the DC component (DC current ripple) idc increases as the input voltage increases.

[Mathematical 21]

$$\frac{d}{dt}i_{dc} = \quad \text{(Expression 20)}$$
$$\frac{1}{2}\left(\frac{d}{dt}i_1 + \frac{d}{dt}i_2\right) = \frac{R_O + 2R_C}{(N_O^2 + 4N_C^2 + 4N_O N_C)} \times \left(V_{in} - \frac{V_{out}}{2}\right)$$

[Mathematical 22]

$$\frac{d}{dt}i_{ac} = \frac{1}{2}\left(\frac{d}{dt}i_1 - \frac{d}{dt}i_2\right) = \frac{R_O}{N_O^2} \times \left(-\frac{V_{out}}{2}\right) \quad \text{(Expression 21)}$$

In general, where the permeability is μ, the core sectional area is Ae, and the circumferential length of the core is 1, the relationship between a magnetic resistance R and the permeability μ of a core is an inverse proportional relationship as shown by (Expression 22).

[Mathematical 23]

$$R = \frac{1}{\mu Ae} \quad \text{(Expression 22)}$$

Figure 5:
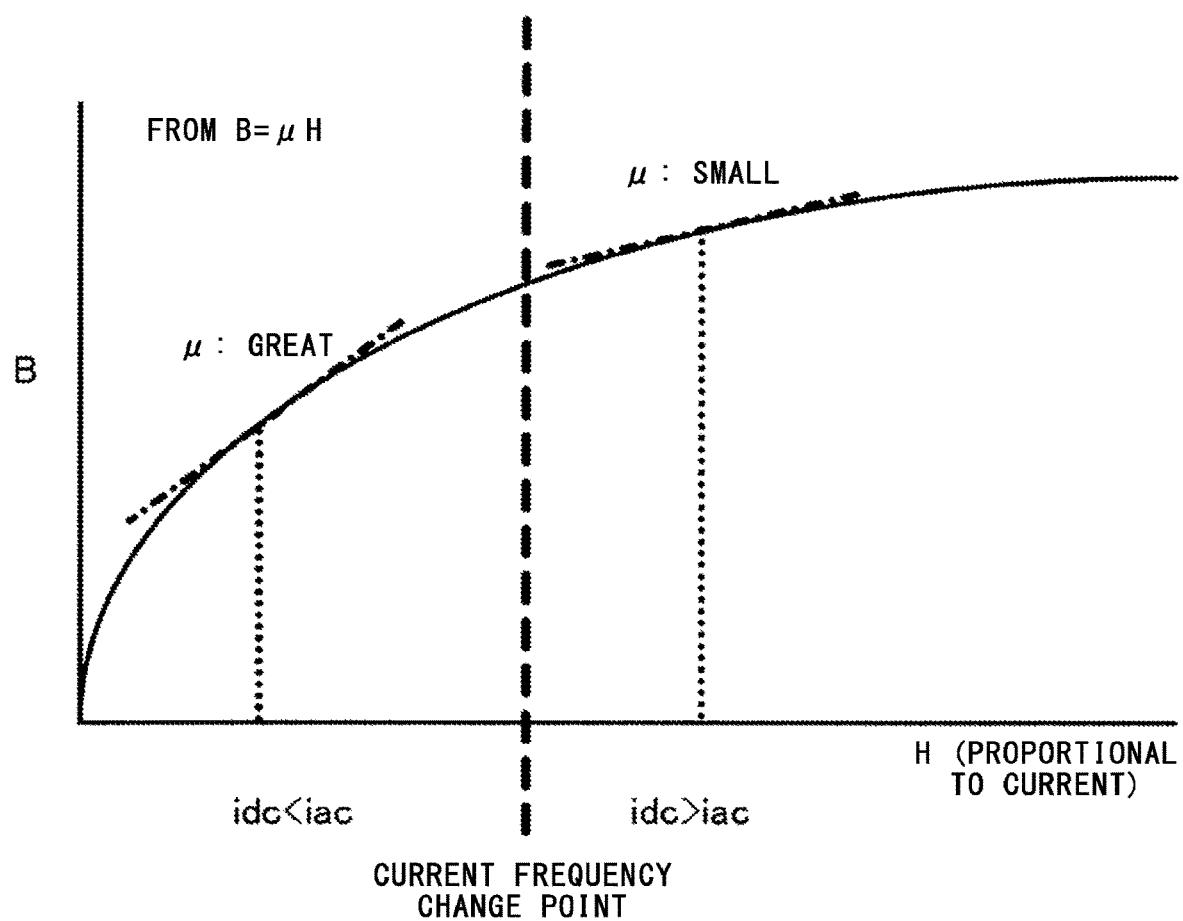
FIG. 5 illustrates nonlinearity of BH characteristic of a core material in embodiment 1 of the present invention.

In the case where the BH characteristic of the core material is nonlinear as shown in FIG. 5, if the permeability μ decreases due to increase in current, the magnetic resistance R increases, so that the DC current ripple idc and the AC current ripple iac represented by (Expression 20) and (Expression 21) increase.

In the case of Rc>>Ro as in a structure in which a gap is provided in the center leg 2h, the amount of increase in the current ripple with respect to increase in the current is greater for the AC current ripple iac than for the DC current ripple idc, and thus it is shown that, for example, even if DC current ripple idc>AC current ripple iac is satisfied where the current is small, DC current ripple idc<AC current ripple iac may be satisfied where the current is great.

Where the DC inductance is Ldc and the AC inductance is Lac, from (Expression 18) and (Expression 19), Ldc and Lac are respectively represented by (Expression 23) and (Expression 24).

[Mathematical 24]

$$L_{dc} = 2L_C + 4M_C + L_O - M_O = \frac{N_O^2 + 4N_C^2 + 4N_O N_C}{R_O + 2R_C} \quad \text{(Expression 23)}$$

[Mathematical 25]

$$L_{ac} = L_O M_O = \frac{N_O^2}{R_O} \quad \text{(Expression 24)}$$

Next, focusing on the inductances, in the DC inductance of (Expression 23), the leakage inductance Lo−Mo of the first winding 2a and the second winding 2b forming the coupled reactor, and the mutual inductance 4Mc between the third winding 2c and the first winding 2a and between the third winding 2c and the second winding 2b, are added to the self-inductance 2Lc of the third winding 2c. Thus, it is found that, owing to magnetic integration, a higher inductance is obtained as compared to a separate-body configuration, and the DC inductance can be adjusted by the number of winding turns and the coupling degree.

As described above, in the integrated magnetic part 2 of embodiment 1 of the present invention, the DC inductance can be formed using, in addition to the self-inductance of the third winding 2c forming the DC reactor, the mutual inductance with each of the first winding 2a and the second winding 2b of the AC reactor, and the leakage inductance of the coupled reactor. Therefore, a reactor having a small size and having a high inductance can be obtained.

Further, in the case where the core has a shape having three legs such as EE type or EI type, a leakage magnetic flux does not occur in the gap of the center leg 2h, and thus the inductance and the leakage inductance can be formed without occurrence of eddy current loss in the third winding 2c wound around the center leg 2h, whereby a function as a filter for the power supply can be assigned.

Hereinafter, reduction of current ripple by using the integrated magnetic part 2 described above will be described in relation to control for the switching elements.

Figure 6:
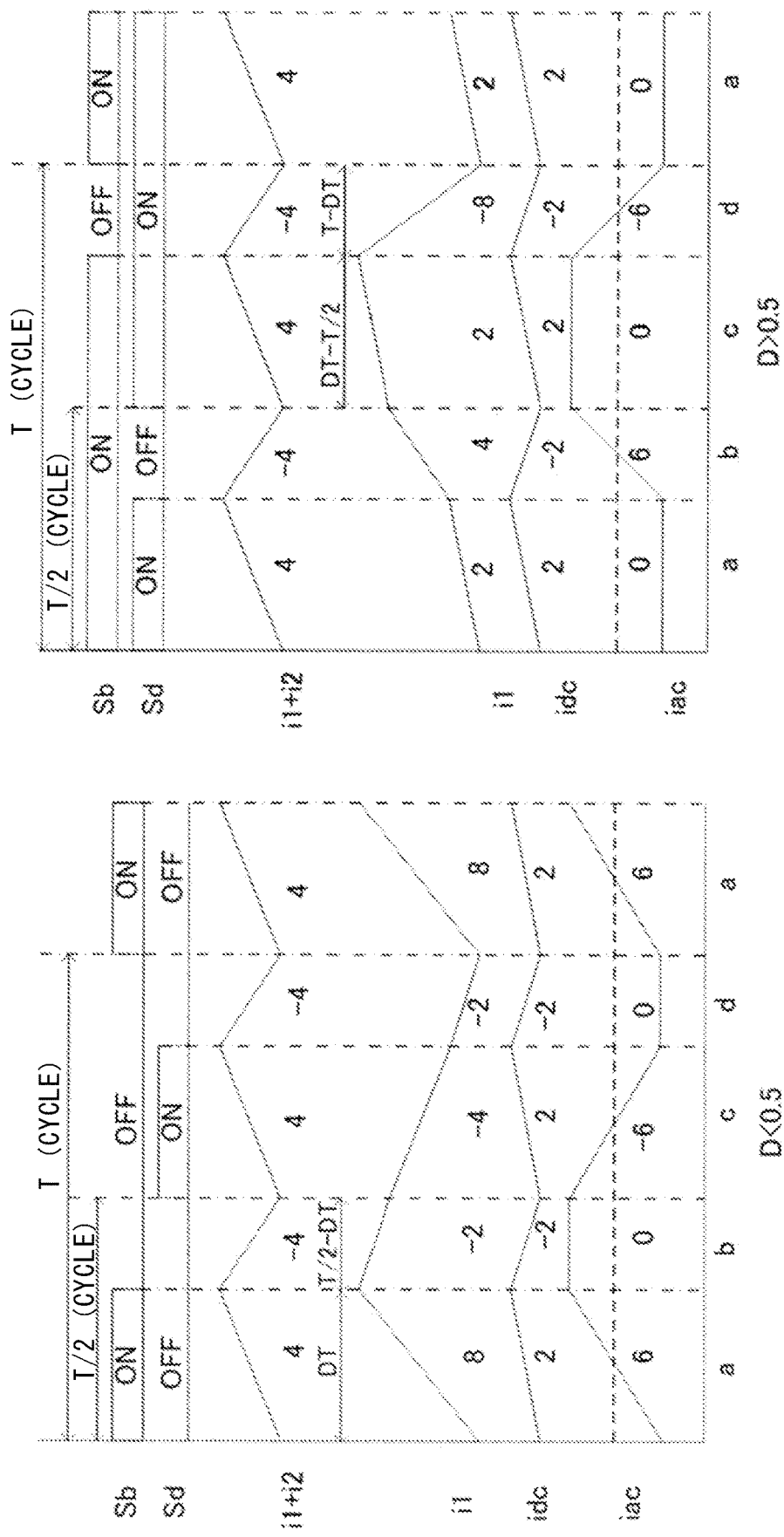
FIG. 6 schematically illustrates occurrence of current ripple in the case of the negative current route shown in FIG. 3.

First, in FIG. 6, an example of occurrence of current ripple during driving of the switching elements will be schematically described. FIG. 6 illustrates current i1 (current ripple) of the first winding 2a in the case of the negative current route shown in FIG. 3, while separating the current ripple into the DC current ripple idc and the AC current ripple iac. FIG. 6(1) shows the case of D (duty)<0.5, and FIG. 6(2) shows the case of D>0.5.

FIG. 6 shows an example in which the DC current ripple contained in the current ripple of the coupled winding is smaller than the AC current ripple (idc<iac). The duty D is the ratio of an ON time to a cycle T.

As operation modes, four modes of a state (a), a state (b), a state (c), and a state (d) are repeatedly executed in accordance with the operation states of the switching elements Sb, Sd. It is noted that the switching elements Sa, Sc respectively operate for synchronous rectification complementarily with respect to the switching elements Sb, Sd.

(1) Case of D<0.5

In the state (a), the switching element Sb is ON and the switching element Sd is OFF, and a current loop is formed in which current flows from the AC voltage source 1 through the third winding 2c, the first winding 2a, the switching element Sb, and then the rectification element Db to return to the AC voltage source 1.

At this time, since the first winding 2a and the second winding 2b are magnetically coupled to form a coupled reactor, AC current ripple iac occurs in the first winding 2a and the second winding 2b, and current ripple obtained by adding DC current ripple idc and AC current ripple iac occurs in the coupled winding. In this example, the DC current ripple idc is smaller than AC current ripple iac, and therefore, if it is assumed that the DC current change amount in the coupled winding is 2 and the AC current change amount is 6, the current change amount in the coupled winding is the sum of these, i.e., 8.

Regarding the current change amount in the third winding 2c which is the DC winding, since the AC current change amount in the coupled winding is canceled out and the current change amount in the third winding 2c is two times the DC current change amount in the coupled winding, the current change amount in the third winding 2c is, in this case, 4.

In the state (b), the switching element Sb is OFF and the switching element Sd is OFF, and a current loop is formed in which current flows from the AC voltage source 1 through the third winding 2c, the first winding 2a, the switching element Sa, the link capacitor 4 for the load, and then the rectification element Db to return to the AC voltage source 1.

Since voltage change does not occur between the first winding 2a and the second winding 2b which are the coupled windings in the integrated magnetic part 2, the AC current ripple iac does not change, the excitation is reset by the output voltage of the link capacitor 4 and the AC voltage source 1, and only the DC current ripple idc in the first winding 2a decreases.

If it is assumed that the DC current change amount in the first winding 2a which is the coupled winding is −2 and the AC current change amount is 0, the current change amount in the coupled winding is the sum of these, i.e., −2.

Regarding the current change amount in the third winding 2c which is the DC winding, since the AC current change amount in the coupled winding is canceled out and the current change amount in the third winding 2c is two times the DC current change amount in the coupled winding, the current change amount in the third winding 2c is, in this case, −4.

In the state (c), the switching element Sb is OFF and the switching element Sd is ON, and a current loop is formed in which current flows from the AC voltage source 1 through the third winding 2c, the switching element Sd, and then the rectification element Db to return to the AC voltage source 1.

At this time, since the first winding 2a and the second winding 2b are magnetically coupled to form a coupled reactor, AC current change occurs in the first winding 2a and the second winding 2b. As a result, current obtained by adding the DC current ripple idc and the AC current ripple iac having a negative slope flows through the first winding 2a, so that the ripple current becomes smaller than in the mode of state (a).

If it is assumed that the DC current change amount in the first winding 2a which is the coupled winding is 2 and the AC current change amount is −6, the current change amount in the coupled winding is the sum of these, i.e., −4.

Regarding the current change amount in the third winding 2c which is the DC winding, since the AC current change amount in the coupled winding is canceled out and the current change amount in the third winding 2c is two times the DC current change amount in the coupled winding, the current change amount in the third winding 2c is, in this case, 4.

In the state (d), as in the state (b), the switching element Sb is OFF and the switching element Sd is OFF, and a current loop is formed in which current flows from the AC voltage source 1 through the third winding 2c, the first winding 2a, the switching element Sa, the link capacitor 4 for the load, and then the rectification element Db to return to the AC voltage source 1.

Since voltage change does not occur between the first winding 2a and the second winding 2b which are the coupled windings in the integrated magnetic part 2, the AC current ripple iac does not change, the excitation is reset by the output voltage of the link capacitor 4 and the AC voltage 1, and only the DC current ripple idc in the first winding 2a decreases.

If it is assumed that the DC current change amount in the first winding 2a which is the coupled winding is −2 and the AC current change amount is 0, the current change amount in the coupled winding is the sum of these, i.e., −2.

Regarding the current change amount in the third winding 2c which is the DC winding, since the AC current change amount in the coupled winding is canceled out and the current change amount in the third winding 2c is two times the DC current change amount in the coupled winding, the current change amount in the third winding 2c is, in this case, −4.

Among the above four modes, the period during which the current ripple in the coupled winding is maximum is the mode of state (a), in which the slope is, in this example, 8.

(2) Case of D>0.5

In the state (a), the switching element Sb is ON and the switching element Sd is ON, and a current loop is formed in which current flows from the AC voltage source 1 through the third winding 2c, the switching elements Sb, Sd, and then the rectification element Db to return to the AC voltage source 1.

At this time, a coupled reactor by magnetic coupling is not formed in the first winding 2a and the second winding 2b, there is no change in AC current ripple in the first winding 2a, and only the DC current ripple idc increases.

If it is assumed that the DC current change amount in the first winding 2a which is the coupled winding is 2 and the AC current change amount is 0, the current change amount in the coupled winding is the sum of these, i.e., 2.

Regarding the current change amount in the third winding 2c which is the DC winding, since the AC current change amount in the coupled winding is canceled out and the current change amount in the third winding 2c is two times the DC current change amount in the coupled winding, the current change amount in the third winding 2c is, in this case, 4.

In the state (b), the switching element Sb is ON and the switching element Sd is OFF, a coupled reactor by magnetic coupling is formed in the first winding 2a and the second winding 2b, so that the AC current ripple iac increases, and the DC current ripple idc in the first winding 2a attenuates because the excitation is reset.

If it is assumed that the DC current change amount in the first winding 2a which is the coupled winding is −2 and the AC current change amount is 6, the current change amount in the coupled winding is the sum of these, i.e., 4.

Regarding the current change amount in the third winding 2c which is the DC winding, since the AC current change amount in the coupled winding is canceled out and the current change amount in the third winding 2c is two times the DC current change amount in the coupled winding, the current change amount in the third winding 2c is, in this case, −4.

In the state (c), as in the state (a), a current loop is formed in which current flows from the AC voltage source 1 through the third winding 2c, the switching elements Sb, Sd, and then the rectification element Db to return to the AC voltage source 1.

At this time, a coupled reactor by magnetic coupling is not formed in the first winding 2a and the second winding 2b, there is no change in AC current ripple iac in the first winding 2a, and the DC current ripple idc increases.

If it is assumed that the DC current change amount in the first winding 2a which is the coupled winding is 2 and the AC current change amount is 0, the current change amount in the coupled winding is the sum of these, i.e., 2.

Regarding the current change amount in the third winding 2c which is the DC winding, since the AC current change amount in the coupled winding is canceled out and the current change amount in the third winding 2c is two times the DC current change amount in the coupled winding, the current change amount in the third winding 2c is, in this case, 4.

In the state (d), the switching element Sb is OFF and the switching element Sd is ON and a coupled reactor by magnetic coupling is formed in the first winding 2a and the second winding 2b. In the first winding 2a, the AC current ripple iac decreases, the DC current ripple idc also attenuates, and current ripple obtained by adding the AC current ripple iac and the DC current ripple idc occurs.

If it is assumed that the DC current change amount in the first winding 2a which is the coupled winding is −2 and the AC current change amount is −6, the current change amount in the coupled winding is the sum of these, i.e., −8.

Regarding the current change amount in the third winding 2c which is the DC winding, since the AC current change amount in the coupled winding is canceled out and the current change amount in the third winding 2c is two times the DC current change amount in the coupled winding, the current change amount in the third winding 2c is, in this case, −4.

Among the above four modes, the period during which the current ripple in the coupled winding is maximum is the mode of (d), in which the slope is, in this example, −8.

Figure 7:
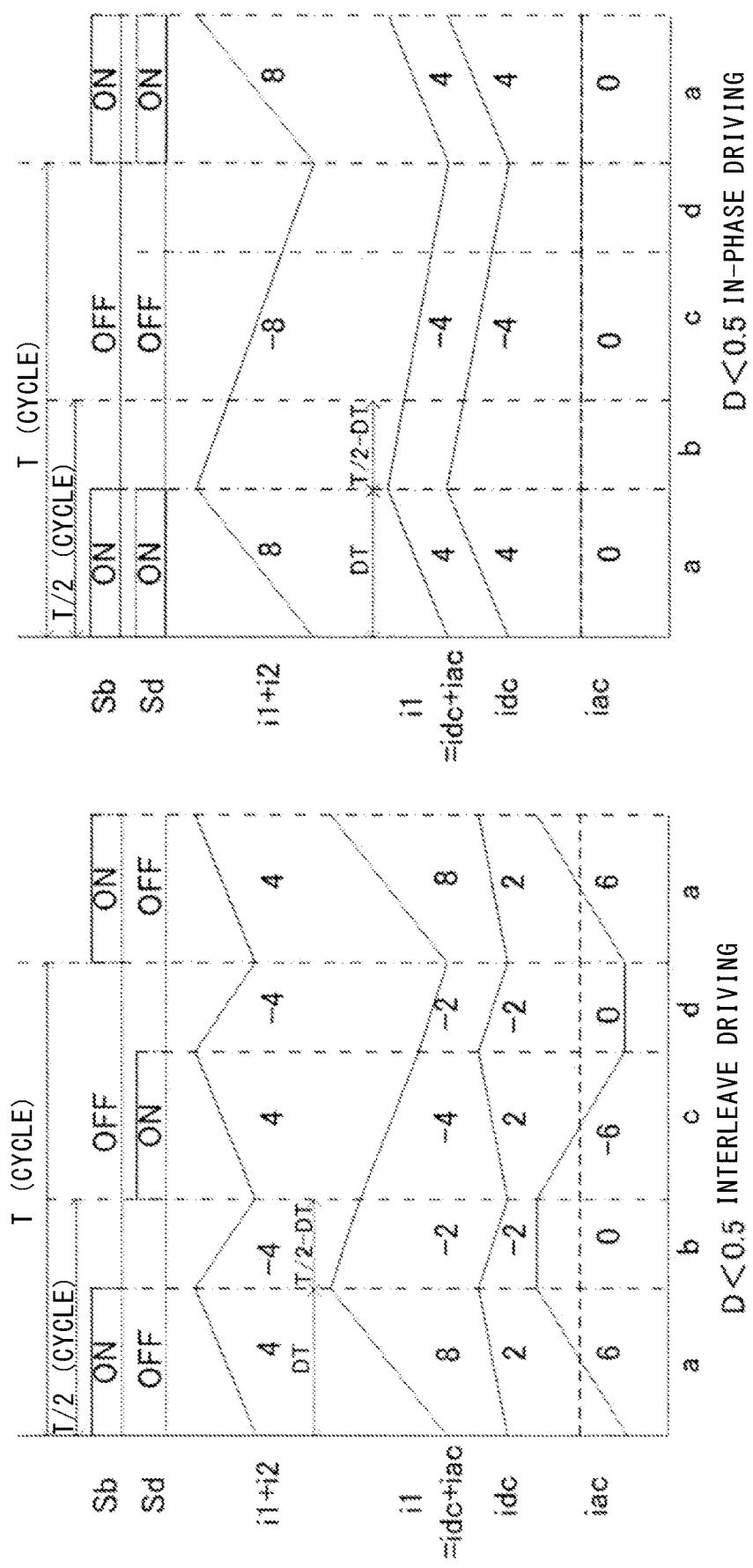
FIG. 7 schematically illustrates occurrence of current ripple in the case of interleave driving and in the case of in-phase driving in embodiment 1 of the present invention.

Next, in FIG. 7, occurrence of current ripple in the case of interleave driving and in the case of in-phase driving will be schematically described as in FIG. 6. FIG. 7(1) is a schematic diagram of current waveforms in the case of interleave driving under the condition in which D<0.5 is satisfied and the DC current ripple is smaller than the AC current ripple (idc<iac). This is the same as FIG. 6(1). FIG. 7(2) is a schematic diagram of current waveforms in the case of in-phase driving under the condition of D<0.5.

Comparing the current change amount of current i1 which is the coupled winding current between both cases, in this example, the value in the case of interleave driving is 8 at maximum, and the value in the case of in-phase driving is 4, thus indicating that the current change amount of the coupled winding current is reduced by in-phase driving.

For example, in the state (a), in comparison between the interleave driving and the in-phase driving, the AC current ripple iac does not occur in the coupled winding in the case of in-phase driving. Where the inductance in the case of in-phase driving is Ldc', Ldc' is represented by (Expression 25), in which the mutual inductance is eliminated, and the slope of the current is represented by (Expression 26), to which only the input voltage is relevant.

[Mathematical 26]

$$Ldc' = 2L_C + L_O \quad \text{(Expression 25)}$$

[Mathematical 27]

$$\frac{d}{dt}i_{dc} = (2L_C + L_O)V_{in} \quad \text{(Expression 26)}$$

Therefore, the DC current ripple in the case of in-phase driving is greater than in the case of interleave driving. Here, for simplification, if it is assumed that the step-up level is low so that Vout is close to Vin, and there is no influence of presence/absence of the mutual inductance 4Mc-Mo, the DC ripple, which is 2 in the case of interleave operation, is approximately doubled, i.e., 4. However, regarding the current ripple in the coupled winding, since the current ripple in the coupled winding is represented as idc+iac, and idc<iac is satisfied in the case of interleave driving, the current ripple in the coupled winding decreases from 8 to 4 by in-phase driving.

Here, in comparison of the DC winding current, in the case of interleave driving, the value is 4, which is two times the DC current ripple in the coupled winding. In the case of in-phase driving, the value is 8, which is two times the DC current ripple. Thus, the current ripple in the DC winding increases by change from interleave driving to in-phase driving. However, since the DC winding is wound around the leg in which the AC magnetic flux is canceled out, the AC resistance of the winding is low, and even if the ripple current increases, increase in AC copper loss is suppressed.

On the other hand, the coupled winding is wound around the leg through which the AC magnetic flux passes. Therefore, the AC resistance of the winding is high, and in the case of interleave driving, since the DC current ripple and the AC current ripple are added, in most cases, the magnetically integrated reactor has a greater coupled winding loss than that in the DC winding.

Therefore, in the case of interleave driving, although the maximum permissible temperature due to uneven heat generation is influenced by loss and cooling in the coupled winding, if control is performed so as to switch between the interleave driving and the in-phase driving in consideration of the characteristics as described above, heat in the DC winding and the coupled winding can be uniformed, whereby size reduction can be achieved in terms of heat dissipation.

Figure 8:
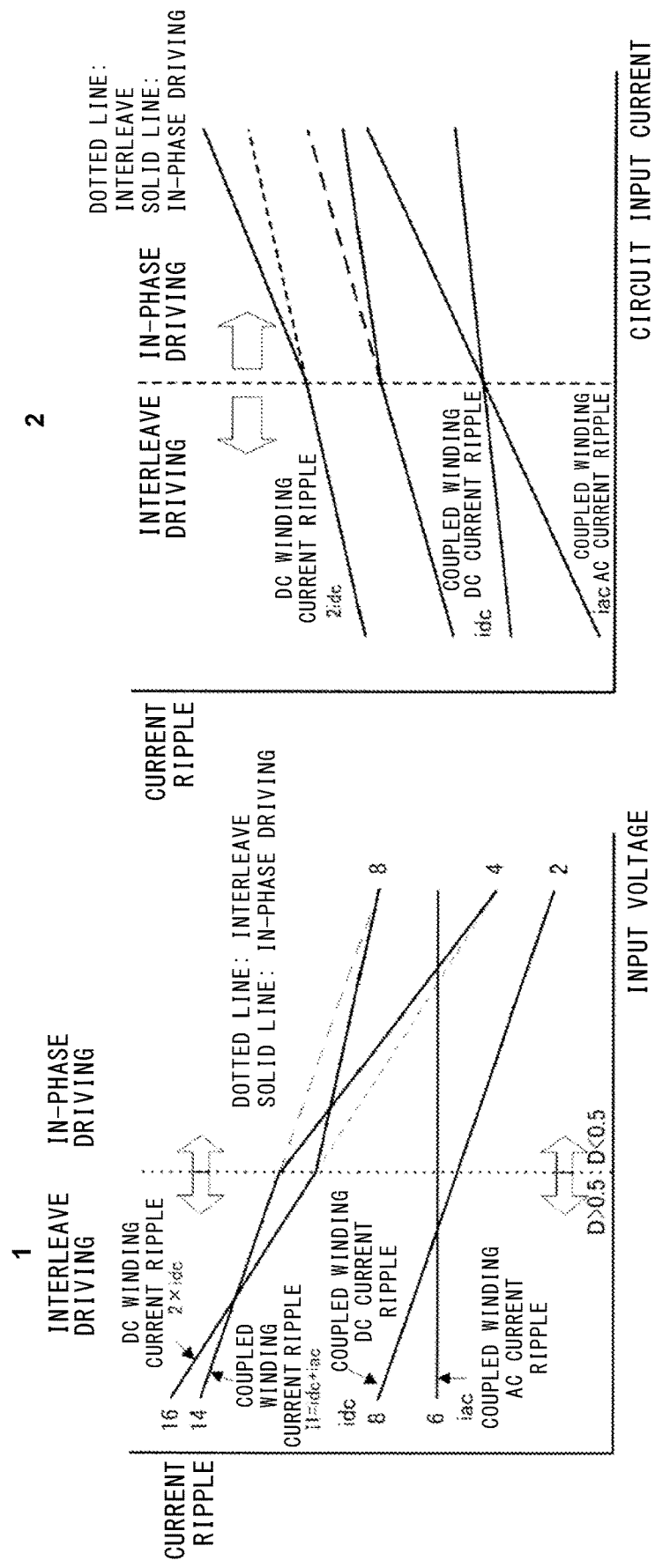
FIG. 8 illustrates a switchover condition between interleave driving and in-phase driving, for reducing current ripple in FIG. 7.

FIG. 8 illustrates a switchover condition between interleave driving and in-phase driving, for reducing current ripple, in the mode of state (a) in which current ripple in the coupled winding is maximum in FIG. 7. FIG. 8(1) shows the relationship between the input voltage and the current ripple, and FIG. 8(2) shows the relationship between the circuit input current and the current ripple.

As shown in (Expression 23) and (Expression 24), the AC current ripple iac is constant irrespective of the input voltage, and the DC current ripple idc decreases as the input voltage increases. At the input voltage where both conditions of idc<iac and D<0.5 are satisfied, the operation is switched from interleave driving to in-phase driving, whereby the current ripple in the coupled winding can be reduced. Detection for the input voltage that satisfies the conditions is performed through detection of the magnitude (level) or the phase of the input voltage on the basis of the input voltage information 10b.

In addition, as shown in FIG. 8(2), at the circuit input current where idc<iac and D<0.5 are satisfied, the operation is switched from interleave driving to in-phase driving. That is, in the case of using the core material in which the permeability μ decreases by increase in the circuit input current as shown in FIG. 5, the inductance decreases and the current ripple increases. However, as described above, in the case of Rc>>Ro, increase in the AC current ripple iac is greater than increase in the DC current ripple idc, and by switching from interleave driving to in-phase driving after the input current where the magnitude relationship of the current ripples is inverted, the current ripple in the coupled winding can be reduced. It is noted that, if the core material as shown in FIG. 5 is not used, as described in FIG. 7, loss can be reduced by switching from interleave driving to in-phase driving merely using the timing for D<0.5. Detection for the input current where the magnitude relationship of the current ripples is inverted is performed through detection of the magnitude (level) or the phase of the input current on the basis of the input current information 10a.

Figure 9:
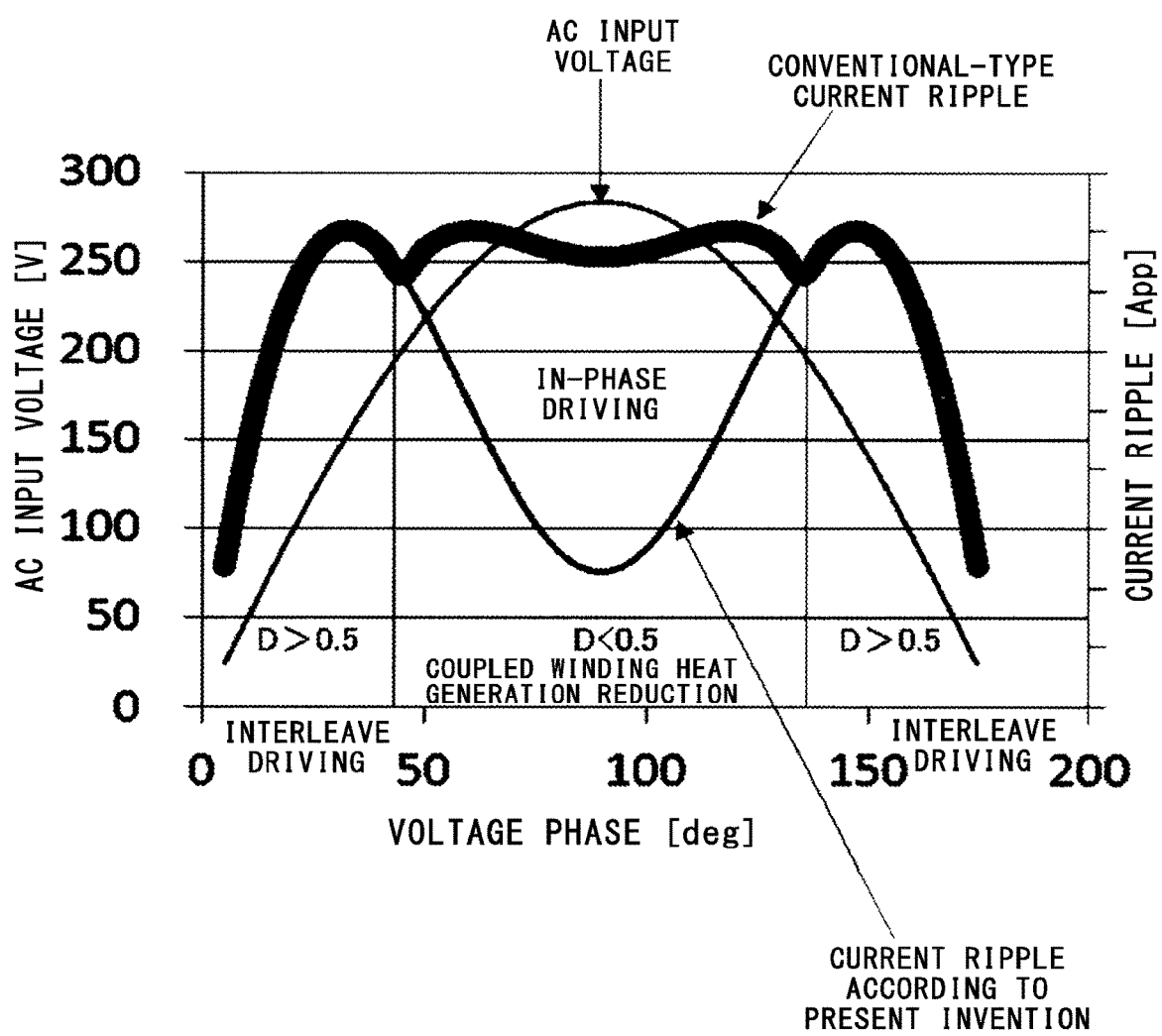
FIG. 9 is a schematic diagram of current ripple in a range where the AC voltage phase is 0 to n in embodiment 1 of the present invention.

FIG. 9 is a schematic diagram of current ripple in a range where the AC voltage phase is 0 to n, when the above operation is applied. It is found that, as compared to the case of performing interleave driving over the entire phase range of the AC voltage, the AC input voltage becomes higher, and by switching the operation to in-phase driving at the time when D<0.5 is satisfied and the AC current ripple is greater than the DC current ripple, the current ripple decreases. In addition, in the case of interleave driving, generated heat in the coupled winding is greater than generated heat in the DC winding, whereas, in the region of D<0.5 in which in-phase driving is performed, generated heat in the coupled winding decreases, and thus heat in the windings can be uniformed.

As described above, in embodiment 1 of the present invention, in the power conversion device using the integrated magnetic part 2, the operation is switched from interleave driving to in-phase driving at the time when D<0.5 is satisfied, whereby the current ripple in the coupled winding can be reduced. In addition, in the case of D>0.5, interleave driving is performed, and therefore, for example, in the case of two-phase interleave driving, the frequency of the current ripple in the DC winding is two times the switching frequency, and current ripple in the power supply and the capacitor for the load is reduced, whereby the filter for the power supply can be downsized. In the case of using the core material in which the permeability μ decreases by increase in the circuit input current, in the power conversion device using the integrated magnetic part 2, by switching the operation from interleave driving to in-phase driving at the time when D<0.5 and idc<iac are satisfied, it is possible to reduce the current ripple in the coupled winding and uniform heat in the DC winding and the coupled winding. In addition, interleave driving may be performed when D>0.5 and idc>iac are satisfied.

Embodiment 2

Figure 10:
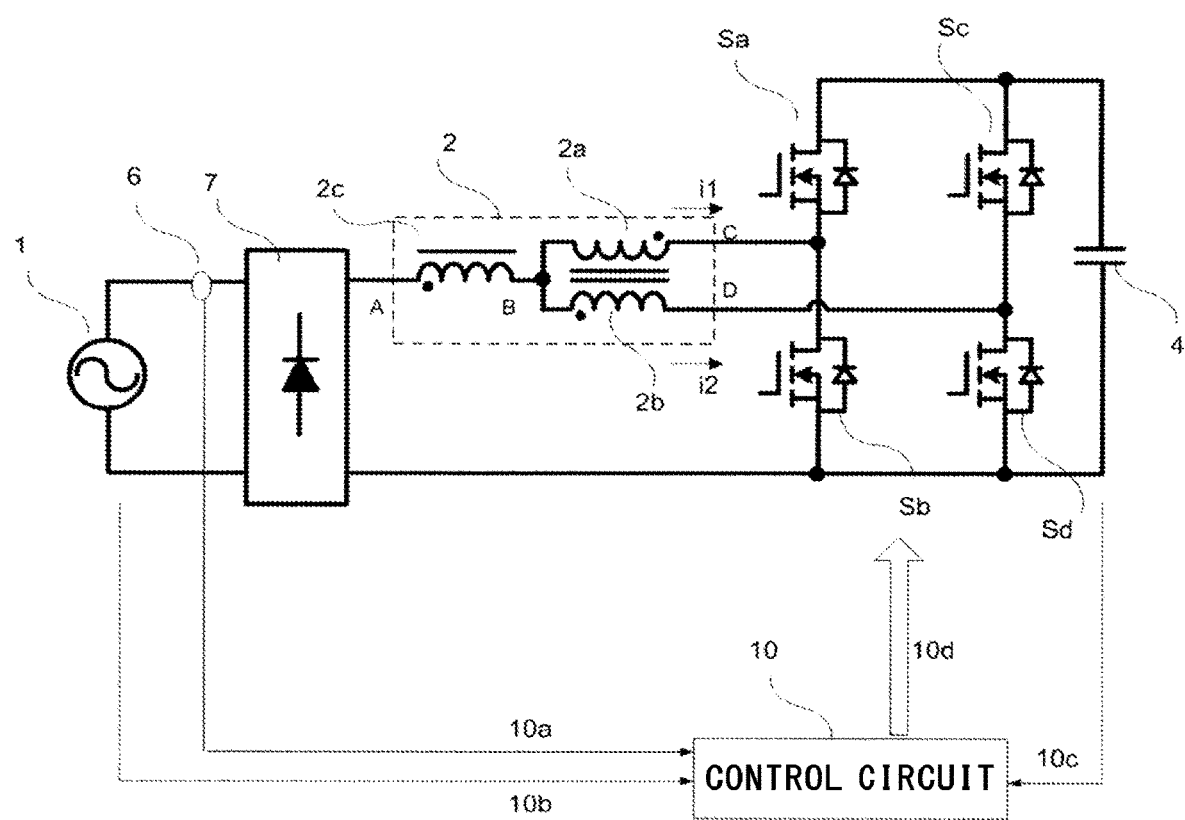
FIG. 10 is a circuit configuration diagram of a power conversion device according to embodiment 2 of the present invention.

FIG. 10 is a diagram showing the circuit configuration of a power converter according to embodiment 2 of the present invention.

This is a PFC converter of step-up type that rectifies AC voltage of the AC voltage source 1 by a bridge diode 7 and outputs the rectified DC voltage to the DC terminal. The positive terminal of the bridge diode 7 after rectification is connected to one end (point A) of the third winding 2c which is the winding of the DC reactor of the integrated magnetic part 2 formed by integrating the coupled reactor and the DC reactor as described in FIG. 1, and one-side ends of the first winding 2a and the second winding 2b which are the windings of the coupled reactor are connected to another end of the third winding 2c of the DC reactor (point B). The AC ends of the switching elements Sa, Sb, Sc, Sd composing the bridge-type converter circuit having upper and lower arms are respectively connected to another end of the first winding 2a and another end of the second winding 2b (point C, point D). The link capacitor 4 as a load is connected to the DC ends of the converter circuit. The negative terminal after rectification is connected to the negative DC end of the converter circuit and the negative terminal of the link capacitor 4.

Regarding the current ripple, the same description as that given in FIG. 6 and FIG. 7 in embodiment 1 applies, and the same effects are obtained. In this case, when the power transmission direction is a direction from the bridge diode 7 to the link capacitor 4, the switching elements Sb, Sd of the lower arms are subjected to in-phase driving, and when the power transmission direction is a direction from the link capacitor 4 to the voltage source, the switching elements Sa, Sc of the upper arms are subjected to in-phase driving.

Embodiment 3

Figure 11:
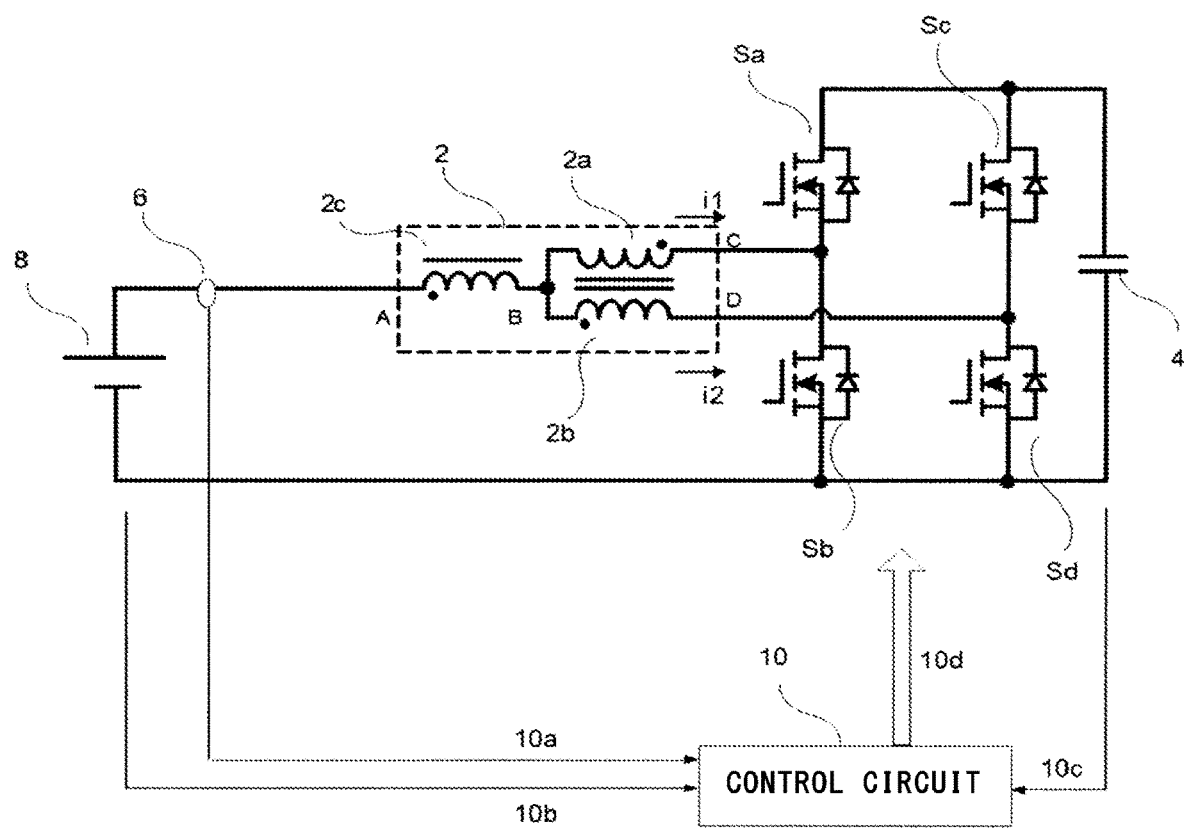
FIG. 11 is a circuit configuration diagram of a power conversion device according to embodiment 3 of the present invention.

FIG. 11 is a diagram showing the circuit configuration of a power converter according to embodiment 3 of the present invention.

This is a DC-DC converter that steps up DC voltage of the DC voltage source 8. The positive terminal of the DC voltage source 8 is connected to one end (point A) of the third winding 2c which is the winding of the DC reactor of the integrated magnetic part 2 formed by integrating the coupled reactor and the DC reactor, and one-side ends of the first winding 2a and the second winding 2b which are the windings of the coupled reactor are connected to another end of the third winding 2c of the DC reactor (point B). The AC ends of Sa, Sb, Sc, Sd of the bridge-type converter circuit having upper and lower arms are respectively connected to another end C of the first winding 2a and another end of the second winding 2b (point C, point D). The link capacitor 4 as a load is connected to the DC ends of the converter circuit. The negative terminal of the DC voltage source 1 is connected to the negative DC end of the converter circuit and the negative terminal of the link capacitor 4.

Regarding the current ripple, the same description as that given in FIG. 6 and FIG. 7 in embodiment 1 applies, and the same effects are obtained. In this case, when the power transmission direction is a direction from the DC voltage source 8 to the link capacitor 4, the switching elements Sb, Sd of the lower arms are subjected to in-phase driving, and when the power transmission direction is a direction from the link capacitor 4 to the DC voltage source 8, the switching elements Sa, Sc of the upper arms are subjected to in-phase driving.

Embodiment 4

Figure 12:
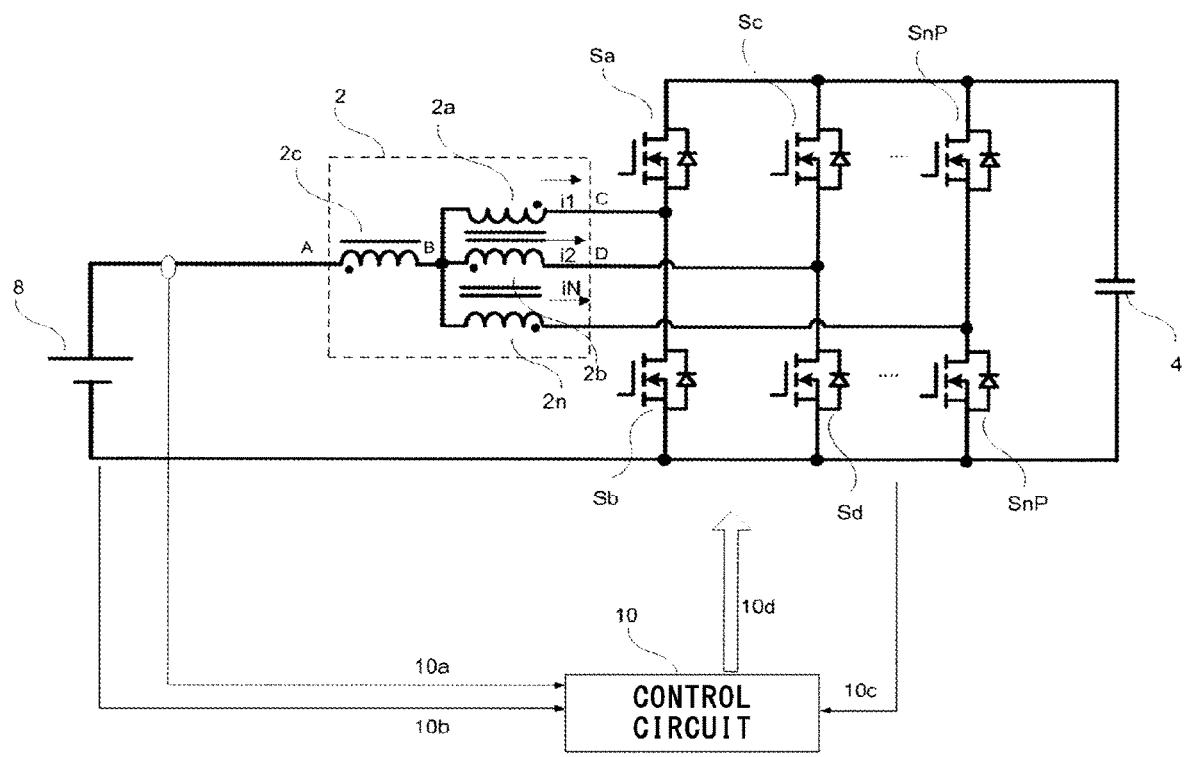
FIG. 12 is a circuit configuration diagram of a power conversion device according to embodiment 4 of the present invention.

FIG. 12 is a diagram showing the circuit configuration of a power converter according to embodiment 4 of the present invention.

Figure 13:
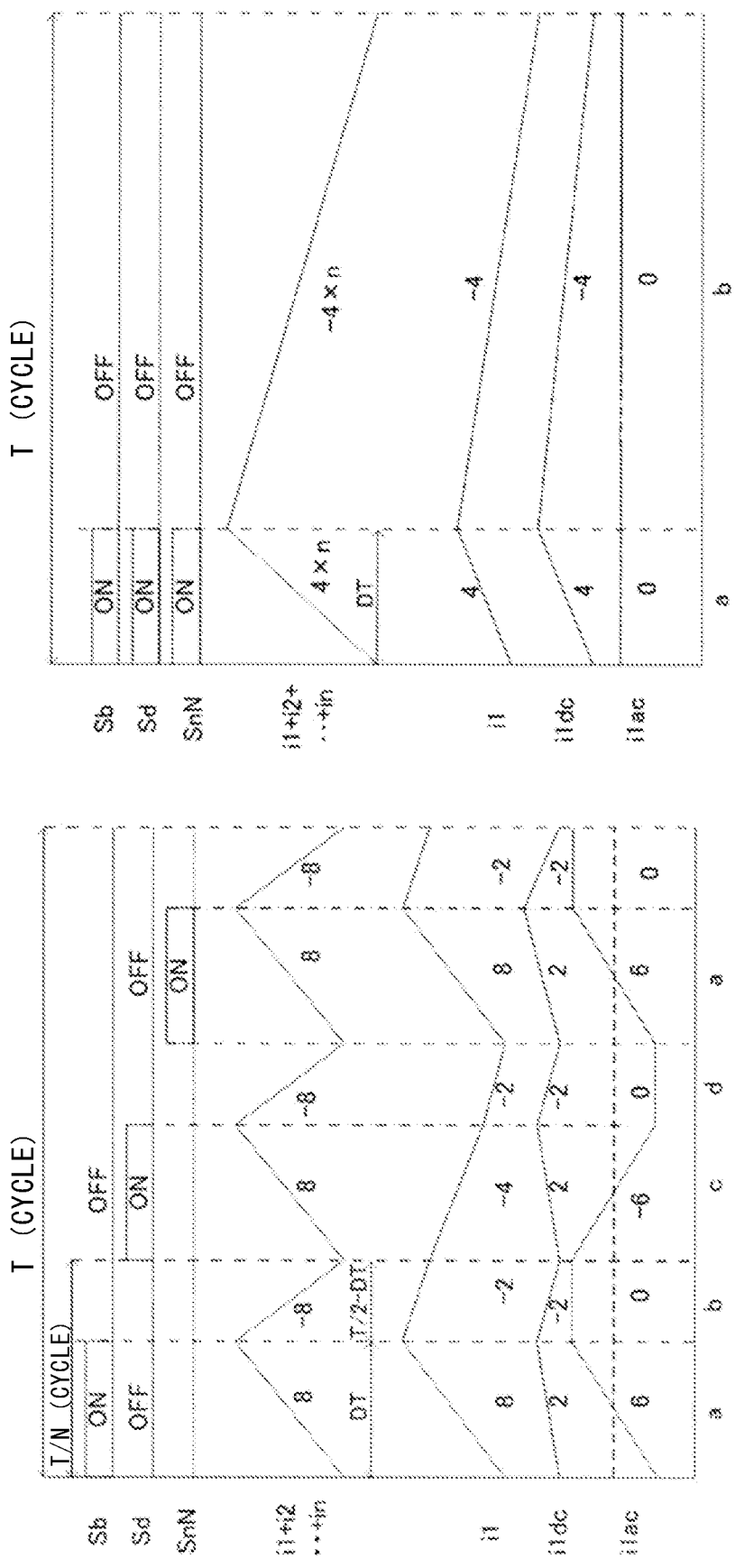
FIG. 13 is a schematic diagram of current ripple in the circuit configuration of the power conversion device according to embodiment 4 of the present invention.

This circuit configuration is obtained by modifying the DC-DC converter of embodiment 3 such that legs to be subjected to interleave driving are provided for N phases. FIG. 13 shows a schematic diagram of current ripple in this circuit configuration. Each leg is merely subjected to switching operation at a timing of 360/N degrees. Along with this, the frequency of the current ripple increases proportionally, and the ON time is shortened, whereby the value of the current ripple itself can be reduced. Thus, the capacitances of input/output capacitors can be reduced, and the current ripple frequency in the power supply and the load becomes N times the switching frequency, whereby the power supply filter can be downsized. Regarding the effect that the current ripple in the coupled winding subjected to in-phase driving decreases, the same operation as that described in embodiment 1 applies, and the same effects are obtained.

It is noted that, within the scope of the present invention, the above embodiments may be freely combined with each other, or each of the above embodiments may be modified or simplified as appropriate.

In the drawings, the same reference characters denote parts having the same or equivalent configurations or functions.

DESCRIPTION OF THE REFERENCE CHARACTERS

1 AC voltage source
2 integrated magnetic part
2a first winding
2b second winding
2c third winding
2n n-th winding
2i first side leg
2j second side leg
2h center leg
3 converter circuit
Sa, Sb, Sc, Sd, SnP, SnN switching element
Da, Db rectification element
4 link capacitor
5 load
6 current sensor
7 bridge diode
8 DC voltage source
10 control circuit
10a input current information
10b input voltage information
10c DC output voltage information
10d drive signal

The invention claimed is:

1. A power conversion device, comprising:
a reactor formed such that a DC winding and a plurality of coupled windings are wound around one magnetic body, one end of the DC winding is connected to a voltage source, one end of each of the plurality of coupled windings is connected to another end of the DC winding, another end of each of the plurality of coupled windings is connected to each intermediate connection point between a plurality of upper and lower arms composed of switching elements, and magnetic fluxes generated by currents flowing through the DC winding and the coupled windings merge with each other in the same direction; and
a control device configured to control the switching elements such that
when it is determined based on a magnitude or a phase of an input voltage or an input current of the voltage source that a duty of a switching operation is smaller than 0.5 and that an AC current ripple composing current ripple in the coupled windings is greater than a DC current ripple thereof, the upper arms or the lower arms are subjected to in-phase driving, and when it is determined based on the magnitude or the phase of the input voltage or the input current of the voltage source that the duty is greater than 0.5 and that the AC current ripple is smaller than the DC current ripple thereof, driving for the upper arms or the lower arms is switched to interleave driving.

2. The power conversion device according to claim 1, wherein the control device is further configured to control the switching elements such that when it is determined based on the magnitude or the phase of the input voltage of the voltage source that the duty is smaller than 0.5 and the AC current ripple composing current ripple in the coupled windings is greater than the DC current ripple thereof, the upper arms or the lower arms are subjected to in-phase driving, and when it is determined based on the magnitude or the phase of the input voltage that the AC current ripple is smaller than the DC current ripple thereof, the upper arms or the lower arms are subjected to interleave driving.

3. The power conversion device according to claim 2, wherein a magnitude relationship between the DC current ripple and the AC current ripple changes in accordance with the input voltage, when the input voltage is lower than a value, the DC current ripple is greater than the AC current ripple, and when the input voltage is greater than the value, the DC current ripple is smaller than the AC current ripple.

4. The power conversion device according to claim 1, wherein the control device is further configured to control the switching elements such that when it is determined based on the magnitude or the phase of the input current from the voltage source that the duty is smaller than 0.5 and the AC current ripple composing current ripple in the coupled windings is greater than the DC current ripple thereof, the upper arms or the lower arms are subjected to in-phase driving, and when it is determined based on the magnitude or the phase of the input current that the AC current ripple is smaller than the DC current ripple thereof, the upper arms or the lower arms are subjected to interleave driving.

5. The power conversion device according to claim 4, wherein a magnitude relationship between the DC current ripple and the AC current ripple changes in accordance with voltage of the voltage source, when the input current is lower than a value, the DC current ripple is greater than the AC current ripple, and when the input current is greater than the value, the DC current ripple is smaller than the AC current ripple.

6. The power conversion device according to claim 1, wherein the voltage source is an AC voltage source, one end of the AC voltage source is connected to the DC winding, and another end thereof is connected to a rectification element connected in parallel with the plurality of upper and lower arms composed of the switching elements.

7. The power conversion device according to claim 1, wherein the voltage source is an AC voltage source, and the control device is further configured to control the switching elements such that in a case of a positive polarity, the upper arms are subjected to in-phase driving, and in a case of a negative polarity, the lower arms are subjected to in-phase driving.

8. The power conversion device according to claim 1, wherein the voltage source is a DC voltage source.

9. The power conversion device according to claim 1, wherein the voltage source is a DC voltage source, and the control device is further configured to control the switching elements such that when a power transmission direction is a direction from the DC voltage source to a load, the lower arms are subjected to in-phase driving, and when the power transmission direction is a direction from the load to the DC voltage source, the upper arms are subjected to in-phase driving.

10. The power conversion device according to claim 8, wherein the DC voltage source is composed of an AC power supply and a rectification element.

11. The power conversion device according to claim 1, wherein the one magnetic body has a core shape that includes three legs, a gap is provided to a center leg thereof, the DC winding is wound around the center leg, and the coupled windings are wound around two side legs thereof located on both sides of the center leg.

12. The power conversion device according to claim 1, wherein switching legs to be subjected to interleave driving are provided for N phases, N being an integer, and when the duty is greater than 0.5, the switching elements are each operated at a timing of 360/N degrees.

* * * * *